F. J. LAPOINTE.
KEY SEAT BROACHING MACHINE.
APPLICATION FILED APR. 30, 1917.

1,266,496.

Patented May 14, 1918.
7 SHEETS—SHEET 1.

Inventor:
Francis J. Lapointe,
by Walter E. Lombard,
Atty.

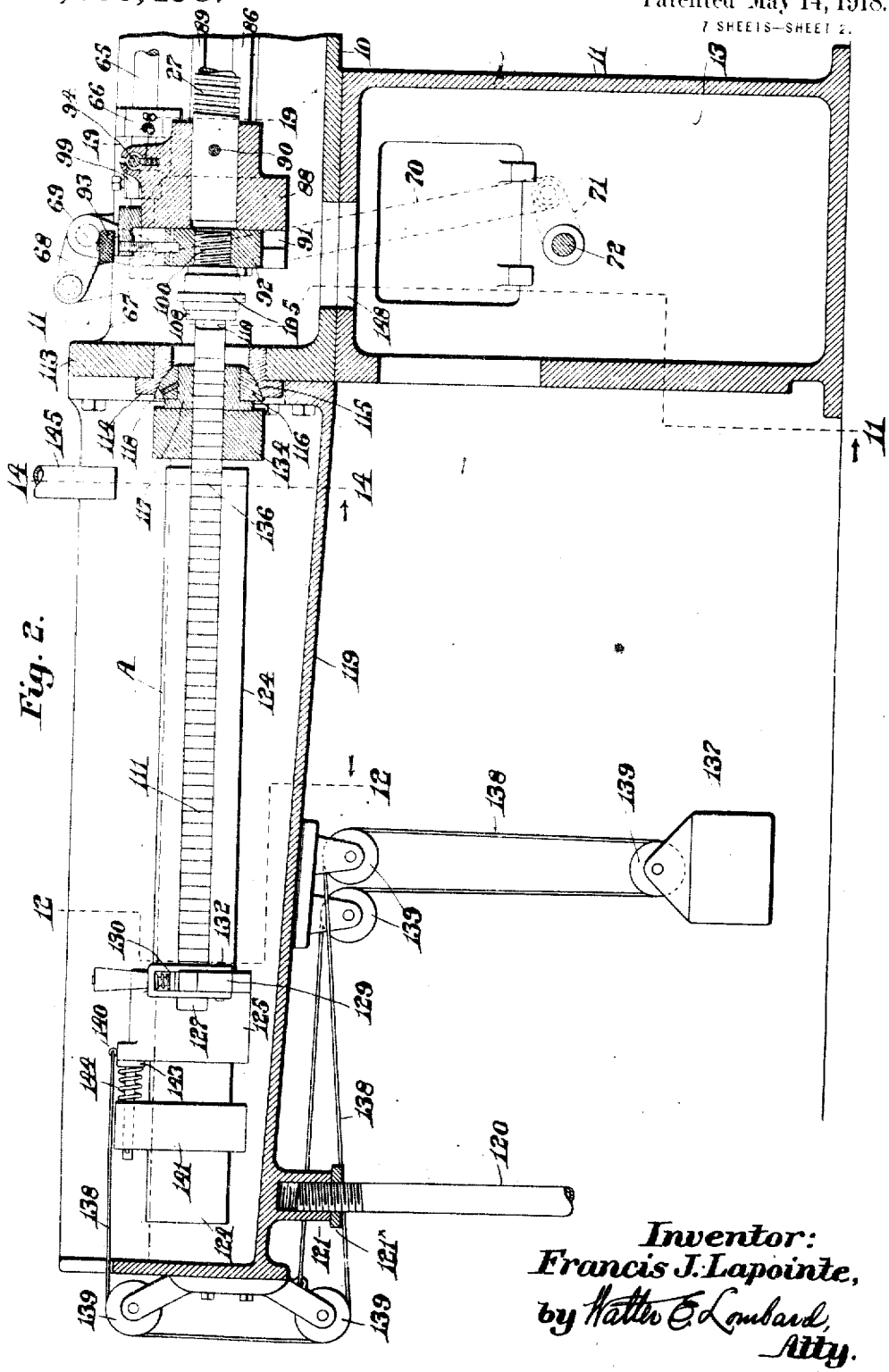

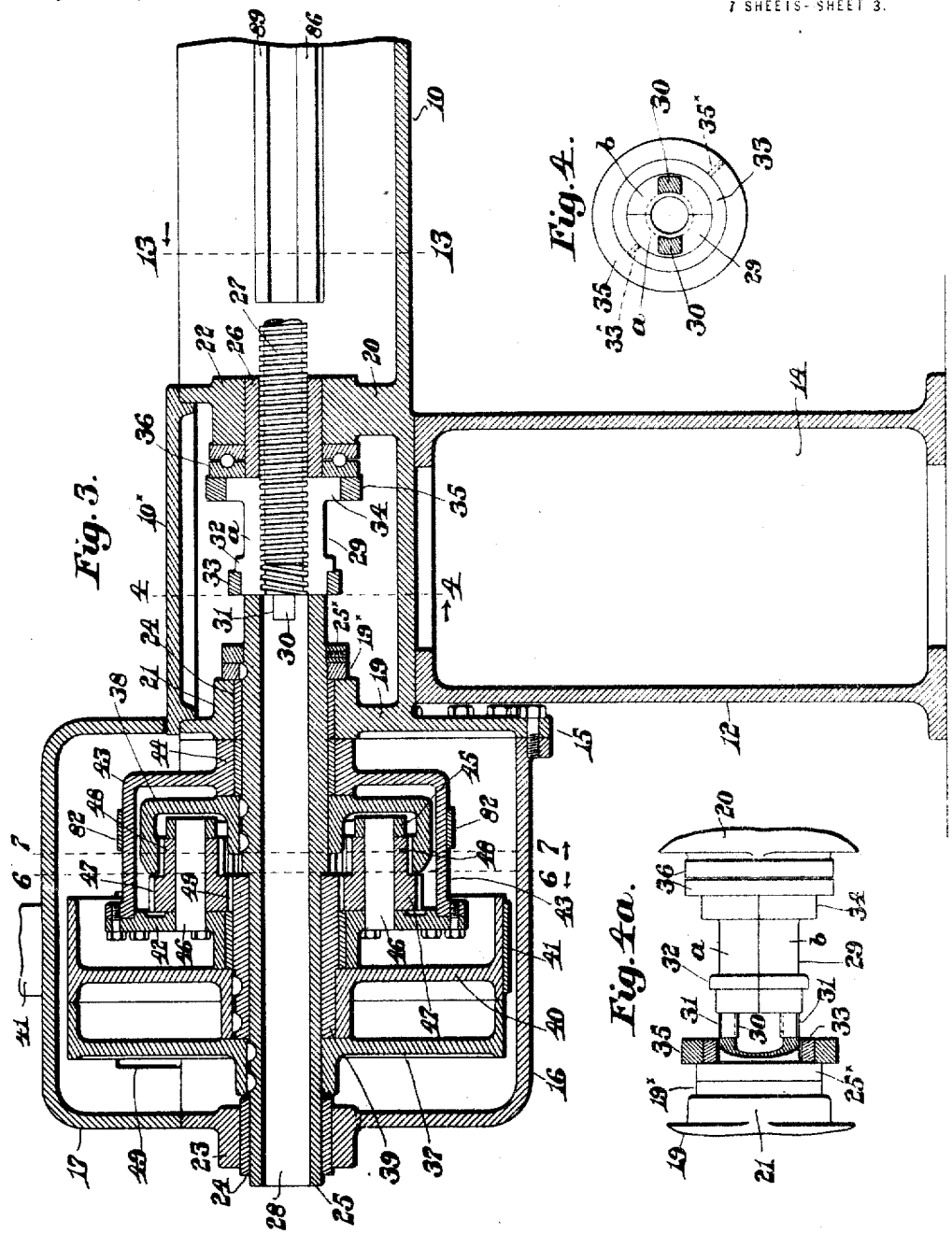

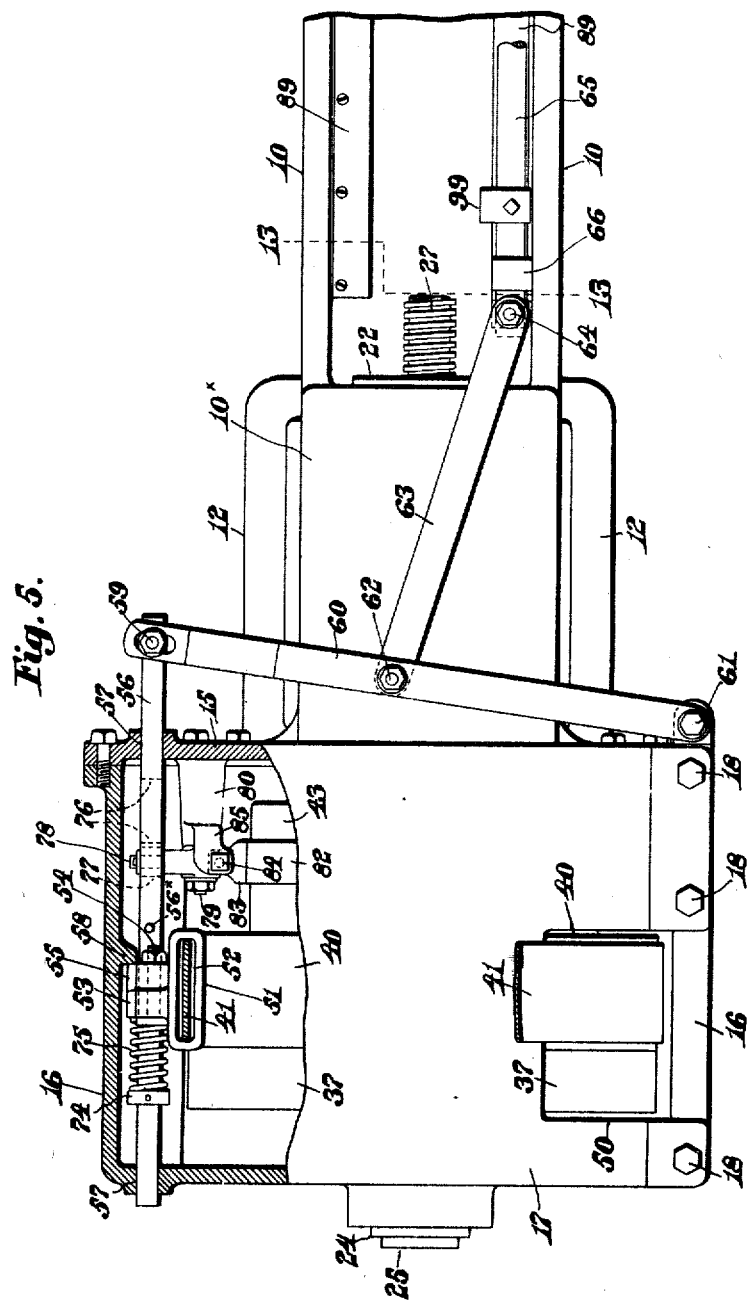

F. J. LAPOINTE.
KEY SEAT BROACHING MACHINE.
APPLICATION FILED APR. 30, 1917.

1,266,496.

Patented May 14, 1918.
7 SHEETS—SHEET 5.

Inventor:
Francis J. Lapointe,
by Walter E. Lombard,
Atty.

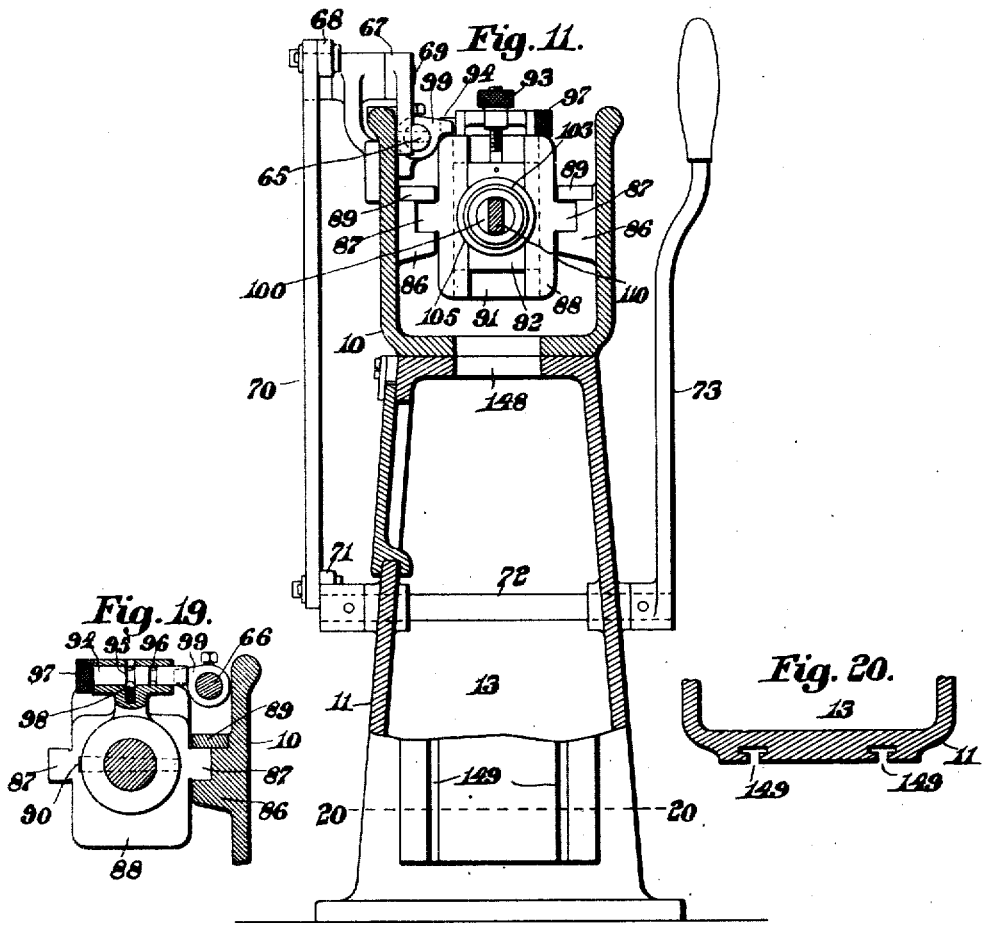
F. J. LAPOINTE.
KEY SEAT BROACHING MACHINE.
APPLICATION FILED APR. 30, 1917.
1,266,496.
Patented May 14, 1918.
7 SHEETS—SHEET 6.
Inventor:
Francis J. Lapointe,
by Walter C. Lombard,
Atty.

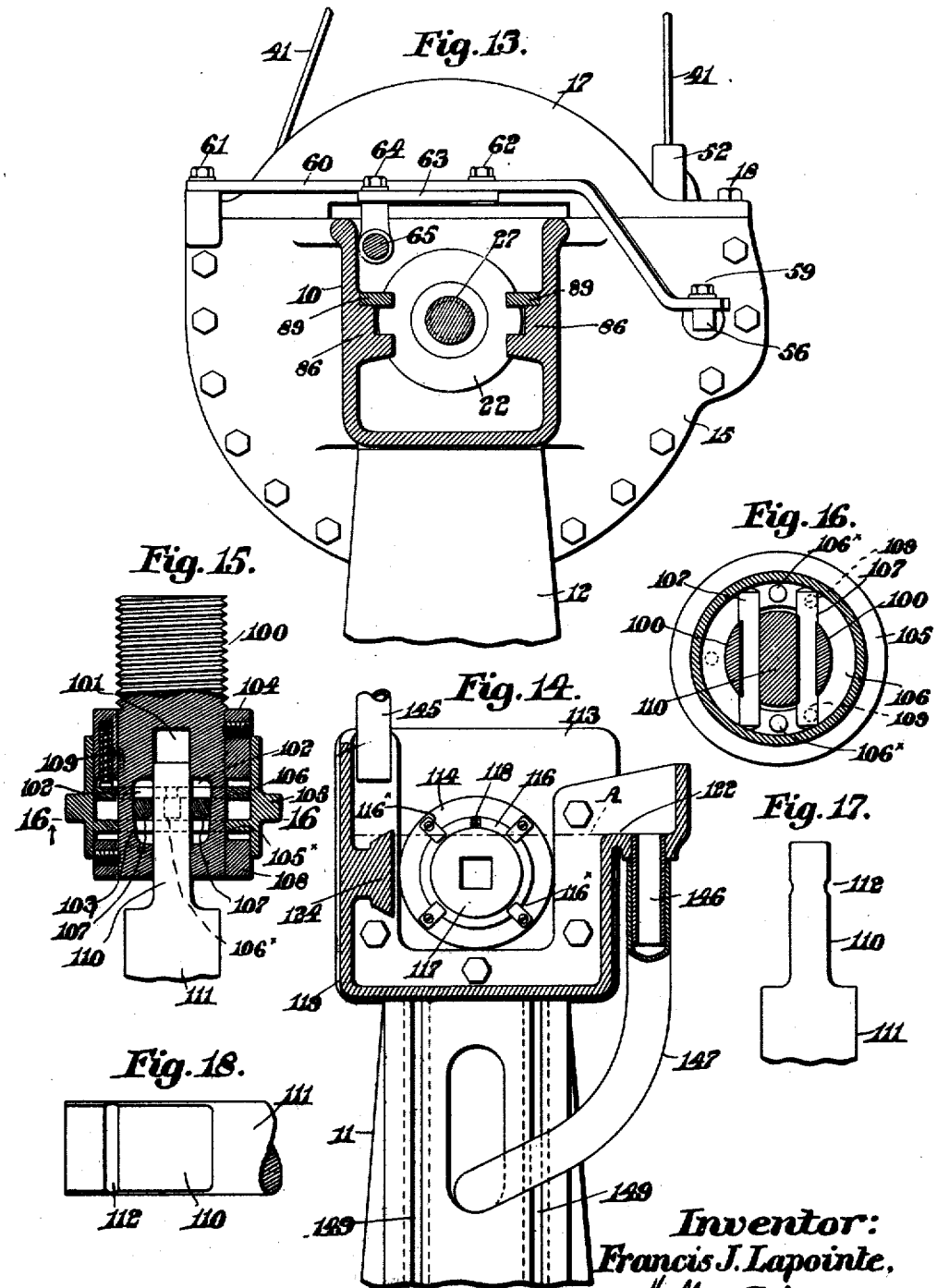

UNITED STATES PATENT OFFICE.

FRANCIS J. LAPOINTE, OF NEW LONDON, CONNECTICUT.

KEY-SEAT BROACHING-MACHINE.

1,266,496.  Specification of Letters Patent.  Patented May 14, 1918.

Application filed April 30, 1917. Serial No. 165,633.

*To all whom it may concern:*

Be it known that I, FRANCIS J. LAPOINTE, a citizen of the United States of America, and a resident of New London, in the county of New London and State of Connecticut, have invented certain new and useful Improvements in Key-Seat Broaching-Machines, of which the following is a specification.

This invention relates to broaching machines, and has for one of its objects the provision of means whereby both ends of the cutting tool will be supported while in operation upon the work and the entire tool will be submerged in oil while cutting.

Another object of the invention is the provision of a self-alining guide for the cutting tool while being drawn through the work.

A further object is to provide a simplified form of driving mechanism whereby the broach or cutting tool may be moved slowly while operating upon the work and the support therefor may be returned quickly to its normal position.

Other objects of the invention are the provision of means whereby the broach may be quickly connected to and disconnected from its broach support and its supporting carriage and means whereby the operating screw may be quickly connected to and disconnected from the driving mechanism.

The invention consists of certain novel features of construction and arrangement of parts which will be fully understood by reference to the description of the drawings and to the claims hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and that the invention is not limited to the precise arrangement and organization of these instrumentalities as herein shown and described.

Of the drawings:

Fig. 2 represents a longitudinal section of the left end of the machine looking to the rear.

Fig. 3 represents a longitudinal section of the right end of the machine looking toward the front thereof.

Fig. 4 represents a transverse section of the screw support on line 4—4 on Fig. 3.

Fig. 4ª represents an elevation partly in section of the device for connecting the operating screw to the driving mechanism.

Fig. 5 represents a plan of one end of the machine broken partly in section to show the belt shifting mechanism.

Figure 6:
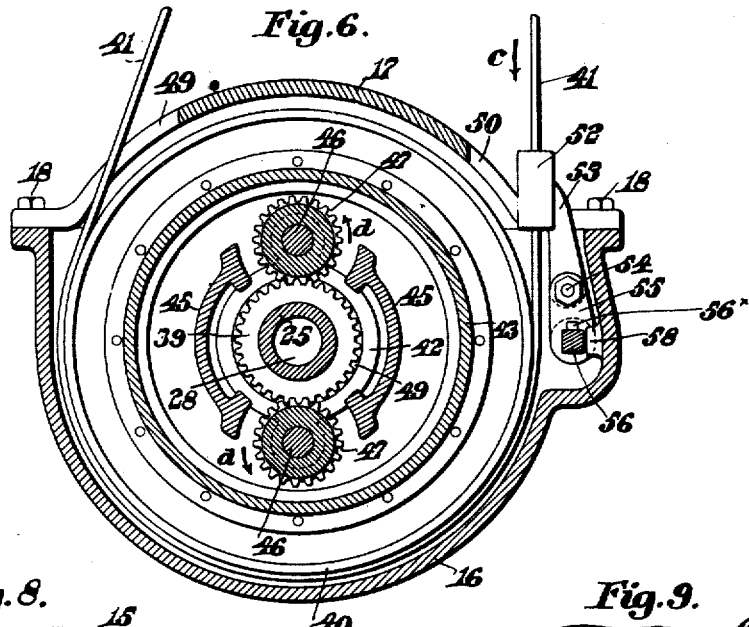

Fig. 6 represents a vertical transverse section of the driving mechanism on line 6—6 on Fig. 3.

Figure 7:
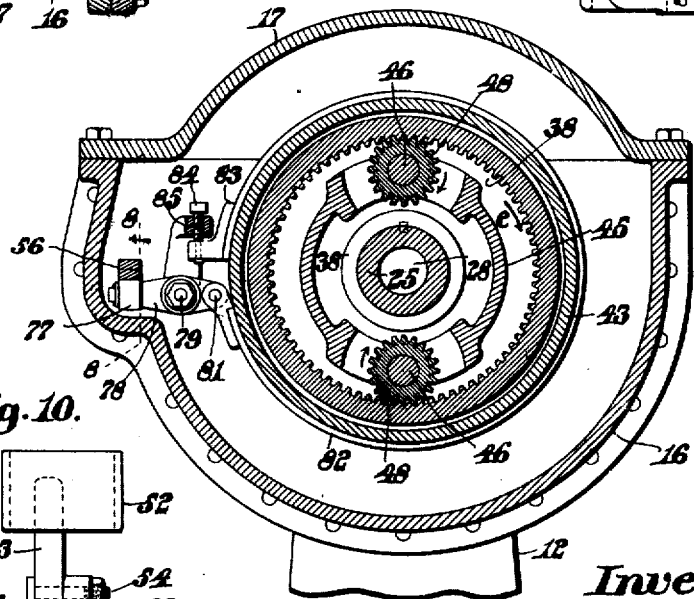

Fig. 7 represents a vertical transverse section of the driving mechanism on line 7—7 on Fig. 3.

Figure 8:
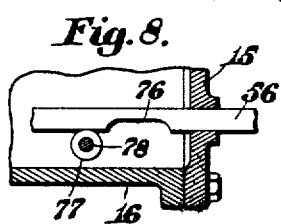

Fig. 8 represents a sectional detail of the belt shifting member.

Figure 9:
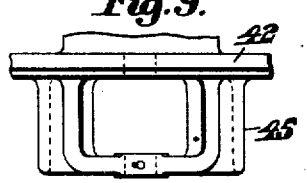

Fig. 9 represents a plan of the housing for planetary gears.

Figure 10:
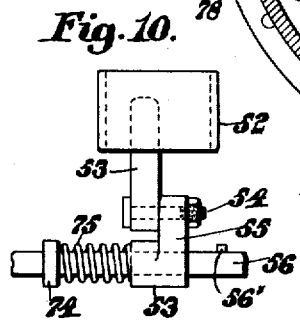

Fig. 10 represents an elevation of the belt shifting device.

Fig. 11 represents a vertical section on line 11—11 on Fig. 2.

Fig. 12 represents a vertical section on line 12—12 on Fig. 2.

Fig. 13 represents a vertical section on line 13—13 on Figs. 3 and 5.

Fig. 14 represents a vertical section on line 14—14 on Fig. 2.

Fig. 15 represents a sectional detail of the broach holder and showing the means of clamping the broach thereon.

Fig. 16 represents a transverse section of the same on line 16—16 on Fig. 15.

Figs. 17 and 18 represent elevations of a modified form of the end of the broach.

Fig. 19 represents a vertical section on line 19—19 on Fig. 2.

Fig. 20 represents a horizontal section on line 20—20 on Fig. 11, and

Fig. 21 represents a sectional detail to be hereinafter described.

Similar characters designate like parts throughout the several figures of the drawings.

In the drawings, 10 represents a bed frame provided with supports 11 and 12. The support 11 is provided with an oil chamber 13 therein while the support 12 is provided with an interior chamber 14. One end of the bed frame 10 is provided with a flange 15 to which is secured a casing 16 having a cover 17 secured thereto by bolts 18. The bed frame 10 is also provided with transoms 19 and 20 having alined bearings 21 and 22. The casing 16 is also provided with a bearing 23 in axial alinement with the bearings 21 and 22. The bearings 21 and 23 are provided with bushings 24 in which is mounted a revoluble tubular member 25.

Keyed to the tubular member 25 is a washer 19× bearing against the inner end of the hub 21 of the transom 19, and threaded to the tubular member adjacent to the washer 19× is a clamping member 25×.

The bearing 22 is also provided with a tubular member 26, the bore of which is adapted to fit the nonrevoluble screw 27 and the bore 28 in the tubular member 25 is of the same diameter as said nonrevoluble screw 27 so that in the reciprocating movement of said nonrevoluble screw 27 it may pass through said bore 28 as will be hereinafter described.

The inner end of the tubular member 25 is separated from the adjacent end of the tubular member 26, and interposed between these adjacent ends of the tubular members 25 and 26 is a nut 29 threaded to the nonrevoluble screw 27. When the nut 29 is rotated the screw 27 will be reciprocated therein. The nut 29 is divided into two parts $a$ and $b$, each part being provided with a projecting lug 30 fitting into diametral slots 31 in the inner end of the tubular member 25. The diameter of the smaller end of the nut 29 is greater than that of the tubular member 25, and is provided with an annular flange 32 against which is positioned a retaining ring or collar 33. The opposite end of the nut 29 is provided with an annular flange 34, the periphery of which is of greater diameter than the diameter of the collar 33, and fitted over this annular flange 34 is a retaining ring or collar 35.

When the ring 33 is positioned over the nut 29 against the shoulder 32 it may be secured in position by means of the set screw 33×. In like manner, when the collar 35 is positioned on the periphery of the flange 34 it may be secured thereto by means of the set screw 35×.

When the parts are in the position indicated in Fig. 3 of the drawings, the nut 29 adapted to be rotated by the tubular member 25 and reciprocate the nonrevoluble screw 27 therein. When it is desired to disconnect the nonrevoluble screw 27 from the nut 29, the collars or retaining rings 33 and 35 are moved into the position indicated in Figs. 4ª of the drawings, and the two parts $a$ and $b$ of said nut 29 are then adapted to be separated and removed from the nonrevoluble screw 27, which may then be quickly withdrawn from the tubular member 26 in an obvious manner.

Surrounding the tubular member 26 is a thrust bearing 36 adapted to take up the end thrust of the nonrevoluble screw 27. The thrust bearing 36 and the nut 29 are positioned within a chamber formed by the side walls of the bed frame 10 and the transoms 19 and 20 and the upper end of this chamber is provided with a cover plate 10× which is readily removable when access is desired to the said nut 29. This cover 10× prevents dust and other foreign substances from coming in contact with the nut 29 and the other operating parts within the aforesaid chamber.

The tubular member 25 has keyed thereto the driving pulley 37 and said tubular member has also keyed thereto the internal gear 38. Between the pulley 37 and the internal gear 38 a sleeve 39 loosely surrounds the tubular member 25, and this sleeve 39 has keyed thereto the driving pulley 40. The pulley 40 is driven in one direction by means of a belt 41 and when this belt 41 is shifted by means to be hereinafter described onto the periphery of the pulley 37, this latter pulley may be driven in the same direction thus directly rotating the tubular member 25.

Loosely mounted upon the sleeve 39 is a disk 42 having secured thereto a brake drum 43 provided with a tubular hub 44 through which extends the tubular member 25, this hub 44 bearing against the bearing 21 of the transom 19. The disk 42 is also provided with a housing 45, said housing and disk 42 having mounted therein the short parallel shafts 46, on each of which is mounted a pair of pinions 47 and 48 adapted to rotate together and preferably formed integral.

Each pinion 47 meshes with the gear teeth 49 formed upon the inner end of the sleeve 39 while the teeth of the pinions 48 mesh with the teeth of the internal gear 38, all as more clearly shown in Figs. 3, 6, and 7 of the drawings. The belt 41 always moves in the direction of the arrow in Fig. 6 of the drawings, and rotates the sleeve 39 and gear 49 in the same direction, thus causing the rotation of the pinions 47 and 48 in the direction of the arrows $d$ on said figure. The pinions 48 meshing with the teeth on the internal gear 38 causes said gear 38 to rotate in the direction of the arrow $e$ on Fig. 7 of the drawings, when the drum 43 is prevented from turning by means of the brake band 82.

As this gear 38 is keyed to the tubular member 25 the nut 29 will be rotated in the direction of the arrow $e$ and cause the nonrevoluble screw 27 to be drawn into the bore 28 of the tubular member 25.

When the belt 41 is shifted onto the periphery of the pulley 37 the tubular member 25 will be rotated in the opposite direction and causes the nonrevoluble screw 27 to be moved outwardly from the bore 28 of the tubular member 25. When the belt 41 is moved onto the periphery of the pulley 37 and the brake band 82 is released from contact with the drum 43 a portion thereof remains upon the pulley 40, and this pulley continues to rotate in the same direction, but as it is mounted upon the sleeve 39 loosely mounted upon the tubular member 25 it will have no effect upon the rotation of said tubular member. This is due to the fact that the internal gear 38 is driven by and rotates in the same direction as the pulley 37, thus causing the pinions 47 and 48 to travel with the disk 42 and the brake drum 43 about the axis of the tubular member 25 on which their hubs are loosely mounted.

The cover 17 is provided with openings 49 and 50 through which extends the belt 41, these openings 49 and 50 being of sufficient width to permit said belt 41 to be shifted from the driving pulley 40 to the reversing pulley 37 or in the opposite direction. This shifting of the belt 41 is effected by means of the belt shifter 51, consisting of a tubular portion 52 through which the belt 41 extends, said tubular portion being formed upon an arm 53 pivotally secured at 54 to another arm 55 secured to a reciprocating rod 56 mounted in bearings 57 in the casing 16. The arms 53 and 55 could be formed integrally, but it is preferred to pivot the two together at 54 so that the tubular portion 52 may be adjusted to any angle which the belt may assume in passing from the counter shaft pulley (not shown) to the pulleys 40—37.

The casing 16 is provided with a lug 58 against which the arm 55 rests when the belt 41 is actuating the pulley 40. The outer end of the rod 56 is pivotally connected at 59 to a lever 60 pivoted at 61 to the casing 16.

Intermediate the ends of the lever 60 at 62 is articulated one end of the link 63, the opposite end of which is pivotally connected at 64 to a reciprocating rod 65 mounted in bearings 66 on the inner face of the bed frame 10. The opposite end of the rod 65 is pivotally connected at 67 to a bell crank lever 68 pivoted to the bed frame 10 at 69 and having its other arm connected by a link 70 to an arm 71 secured to the oscillating shaft 72 extending through the standard 11 with its outer end provided with the operating handle 73.

By means of this operating handle 73 the rod 65 may be moved in either direction to shift the belt 41 from one driving pulley to the other. The belt shifting rod 56 is preferably square in cross section, as indicated in Fig. 6 of the drawings, and is provided with a collar 74 secured thereto and between which and the arm 55 is interposed the buffer spring 75, which yieldingly limits the movement of the belt shifting rod 56 when the belt 41 is shifted onto the periphery of the pulley 37.

The spring 75 also serves to retain the arm 55 in contact with the pin 56$^x$ projecting from the rod 56, thus permitting the arm 55 to yield slightly against the tension of the spring 75 when said arm 55 comes into contact with the stop lug 58.

The under side of the rod 56 is provided with a cam depression 76. When the belt 41 is coacting with the pulley 40 the cam depression 76 of the belt shifting rod 56 is in the position indicated in Fig. 8 relatively to the roll 77 revolubly mounted upon the outer end of a lever 78 pivoted at 79 to an inwardly projecting lug 80 on the flange 15.

The opposite end of the lever 78 has pivoted thereto at 81 a brake band 82 the opposite end of which has secured thereto a foot 83 in which is revolubly mounted the adjusting member 84 threaded to an arm 85 extending upwardly from and formed integral with said inwardly projecting lug 80.

When the roll 77 is in contact with the lower face of the squared belt shifting rod 56 the brake band 82 will be in contact with the brake drum 43 and prevent its rotation about the axis of the tubular member 25. The amount of friction between the brake band 82 and said brake drum 43 may be adjusted by means of the member 84. When the belt 41 is shifted to coöperate with the pulley 37, the cam depression 76 will be moved into the same plane with the roll 77 and thereby permit the roll to move upwardly about the pivot 79 and thus release the brake band 82 from frictional contact with the drum 43. It will be obvious that when in this position the drum 43 and disk 42 carrying with them the pinions 47 and 48 will be free to move about the axis of the tubular member 25.

The bed frame 10 is provided with inwardly extending guide members 86 adapted to support the projecting ribs 87 formed upon the opposite sides of the reciprocating carriage 88. These guide members 86 have secured to their upper faces the plates 89, thus forming grooves to receive the projecting ribs 87 of the reciprocating carriage 88 and guide it in its reciprocatory movement.

The reciprocating carriage 88 is secured to the end of the nonrevoluble screw 27 by means of the pin 90. The outer face of the reciprocating carriage 88 is provided with a T-shaped groove 91 in which is mounted the tool support 92 adapted to be moved vertically in said groove 91 by means of the adjusting member 93.

In the upper part of the reciprocating carriage 88 is mounted a pin 94 having annular grooves 95 and 96 therein. This pin 94 is provided with a head 97 by which it may be moved endwise transversely of the bed frame 10. A spring pressed ball 98 is provided in the reciprocating carriage 88 whereby the pin 94 may be locked in the position indicated in Fig. 19 of the drawings, or when moved outwardly with the groove 96 in position to be engaged by the spring pressed ball 98.

When the pin 94 is in the position indicated in Fig. 19 of the drawings, its outer end is in position to engage the lugs upon the members 99 secured to the rod 65.

Before starting to operate upon any piece of work the stop members 99 are adjusted on the rod 65 in such position that at the completion of the movement of the working tool through the work the projecting end of the pin 94 will move one stop member sufficiently to stop the machine. In a similar manner the pin 94 will coact with the other stop member on the return movement of the carriage 88 to its normal position and the rod 66 will be moved sufficiently to again stop the machine preparatory to another operation of the working tool.

Screwed into the tool support 92 is the member 100 having a transverse slot 101 therein and recesses 102 on either side of said slot, said recesses having inclined walls 102 the outer ends of which are nearer together than the inner ends, as indicated in Fig. 15 of the drawings.

The outer end of the member 100 has secured thereto the collar 104 surrounded by a sleeve 105 having an inwardly extending flange 105×, between which and the inner end of the collar 104 is interposed a washer 106. Between the flange 105× and the washer 106 and positioned in the recesses 102 are the rollers 107.

Upon the extreme outer end of the member 100 is secured a positioning ring 108 which limits the outward movement of the sleeve 105. The washer 106 is moved outwardly by a plurality of spring pressed members 109 in recesses in the collar 104.

When the shank 110 of the working tool 111 is inserted into the slot 101 the rollers 107 will be moved to the rear of the recesses 102 and permit the ready insertion of said shank. As soon as the shank has been inserted the spring pressed members 109 acting on the washer 106 will force the rollers into the narrowest parts of the recesses 102 and grip firmly upon the shank 110. When the shank 110 is moved from the slot 101, studs 106× extending from the face of the washer 106 retain the rollers 107 separated sufficiently to permit the insertion of the shank 110.

Figure 1:
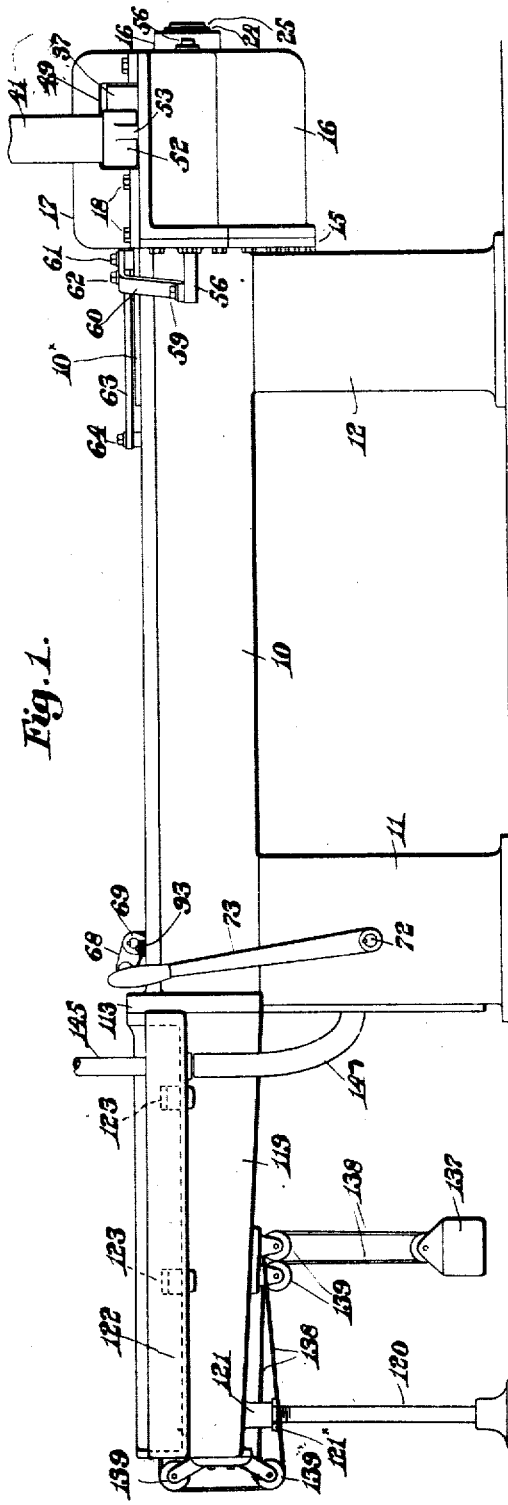
Figure 1 represents a front elevation of a machine embodying the principles of the present invention.

When the carriage 88 is moving to the right of Fig. 1 of the drawings, it is obvious that the rollers 107 will be crowded into narrow portions of said recesses and more firmly grip upon the shank of the working tool 111. When it is desired to remove the shank 110 from the slot 101, the operator forces the sleeve 105 to the rear against the tension of the spring pressed members 109, thereby moving the rollers 107 into the widest parts of the recesses 102, and thereby permitting the ready removal of said shank 110. If desired, the opposite sides of the shank 110 may be provided with depressions 112, such as shown in Fig. 18, with which depressions 112 the rollers 107 may coact when the working tool is operating upon the work.

The outer end of the bed frame 10 is provided with a vertical end plate 113 having mounted in the opening therethrough a bushing 114 provided with a semi-spherical bearing surface 115, in which is mounted the semi-spherical member 116 carrying a guide 117 for the working tool. This guide 117 is removable, and when positioned in the member 116 may be secured thereto by means of the screw 118.

By means of this construction, it is obvious that the guide 116—117 will be self-alining. The member 116 is prevented from being displaced from the member 114 by means of the clips 116× secured to the outer face of said outer member 114. To the outer face of the end plate 113 is secured the U-shaped extension 119, the outer end of which is supported by the member 120, the upper end of which is threaded to the hub 121 projecting downwardly from the extension 119. When the rod 120 has been adjusted in the projection 121, it is locked in its adjusted position by the clamping nut 121×.

The U-shaped extension is provided with a shelf 122 to which is secured a plurality of recessed blocks 123 on which the working tool is adapted to be placed when removed from the tool holder. These blocks 123 are preferably made of wood so that the working tool 111 will not be injured. The opposite side of the U-shaped extension 119 is provided with a guide rail 124 on which is mounted a reciprocating support 125 having a depression 126 in the upper face thereof adapted to receive the cylindrical end 127 of the tool 111. The member 125 has pivoted thereto at 128 the cap 129 normally secured in position by means of the spring pressed member 130 carried by the lever 131 pivoted at 132 to the member 125.

When it is desired to remove the working tool for any reason the handle lever 131 is moved to the left of Fig. 12 until the member 131 comes into contact with the shoulder 133 on the support 125.

The cap 129 may then be moved about its pivot 128 to permit the working tool to be removed from the support. The same operation is performed when a new tool 111 is to be placed in position. When the working tool is operating upon the work 134 the support 125 will move along the guide 124 with the tool until said member 125 comes into contact with the pin 136 projecting from the face of said guide 124.

Further movement of the support 125 toward the right of Fig. 2 will be prevented, and as the tool 111 continues to move in that direction, the cylindrical end 127 thereof will be disengaged from said members 125—129 by the continued movement of the member 111 after the support has been stopped. The member 125 as soon as disengaged from the working tool 111 will be returned to its normal position by means of the weight 137 connected by means of a cord 138 passing over various sheaves 139 to an eye 140 secured to said support 125. The member 141 is clamped by means of the screw 142 to the guide rail 124 and has a headed stop member 143 mounted in the upper end thereof adapted to limit the movement of the support 125 toward the outer end of the extension 118.

This member 143 is provided with a spring 144 which is adapted to take up the shock when the support 125 has been brought into contact with the member 143 by the dropping of the weight 137. The friction upon the cylindrical end 127 of the working tool 111 caused by the clamping of the cap 129 thereon is sufficient to lift the weight 137 as the support 125 is moved to the right of Fig. 2 during the operation of the working tool.

The U-shaped extension 119 is adapted to be filled with oil to the level indicated by the dotted line A on Fig. 2 of the drawings, this oil being constantly supplied thereto from any suitable source of supply through the pipe 145.

From the projecting shelf 122 extends an outlet pipe 146, to the lower end of which is secured a flexible tube 147 extending into the oil receptacle 13, thereby providing a means whereby the oil is constantly retained at the level A while the machine is in operation. This provides a means whereby the working tool while in operation is always submerged in oil, a portion of which is adapted to leak through the work and the guide 117 into the chamber of the bed frame 10 and pass through the opening 148 into the chamber 13.

When the tool 111 is removed from the tool holder 100 the oil in the U-shaped casing 119 will be permitted to pass freely through the opening in the guide 117 into the chamber of the bed frame 10 and through the opening 148 into the chamber 13. The outer face of the standard 11 is flush with the outer face of the vertical end plate 113 of the bed frame 10 and this face is provided with a plurality of T grooves 149 by which work may be clamped thereto and operated upon by the working tool when the extension 119 has been removed therefrom.

The hub 44 of the drum 43 is interposed between the hub of the internal gear 38 and the hub 21 of the transom 19 and as the internal gear 38 is keyed to the tubular member 25 and the washer 19× is also keyed to said tubular member 25, end movement of said tubular member 25 is prevented. The washer 19× is retained in place upon the tubular member 25 by means of the clamping member 25× threaded on said tubular member.

Normally the operating lever 73 is in a vertical position and the belt 41 is on the wide pulley 40. At this time the brake band 82 is not contracted, therefore the wide pulley through the gear 49 drives the intermediate gears 47 and 48 coacting with the internal gear 38, thus causing the drum 43 to revolve in the opposite direction to the direction of movement of said pulley 40.

As the result of moving the pulley 40 in one direction and the drum 43 in the opposite direction, said intermediate gears 47 and 48 will be moved about the axis of the tubular member 25 without effecting any movement of the internal gear 38, and as a consequence no end movement will be imparted to the screw 72.

When the lever 72 is moved into the position shown in Fig. 1, the brake band 82 is brought into gripping contact with the drum 43 to prevent its rotation. The belt 41 will then rotate the pulley 40 and through the gear 49 the intermediate gears will have imparted thereto rotary movement which in turn will be imparted to the internal gear 38 in the direction of the arrow on Fig. 7, thus causing the tubular member 25 to be rotated and turn the nut 29 in a direction to draw the screw 72 endwise and effect an operation of the working tool 111 on the work 134.

When the tool holder carriage in its reciprocation with the pin 94 thereon comes into contact with one of the stop lugs 99, the rod 65 will be moved to cause the operating lever 73 to be returned to its normal vertical position.

When the lever 78 is pushed to the extreme right (see Fig. 1) the belt 41 will be moved onto the narrow pulley 37, a portion of the belt remaining on the wide pulley 40, thus locking the two pulleys 37—40 together, and causing a direct drive and the rotation of the nut 29 in a direction to return the screw 72 to its original starting position.

It is believed that the operation and many advantages of this invention will be fully understood from the foregoing description.

Having thus described my invention, I claim:

1. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth; a pulley secured to said sleeve; an annular gear secured to said tubular member; and gearing interposed between said gear teeth and said annular gear.

2. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member; a pulley on said sleeve; means for shifting a belt from one pulley to the other; and mechanism coacting with said sleeve pulley for reversing the rotation of said tubular member.

3. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; two driving pulleys adapted to be driven by a single belt; a belt shifter; and means whereby said tubular member may be rotated in one direction by one of said pulleys rotating in the same direction and whereby said tubular member may be rotated in the opposite direction by the other pulley when driven in the same direction as said first mentioned pulley.

4. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted on said sleeve; a stud extending from the face thereof; a pinion thereon meshing with said gear teeth; a second pinion on said stud revoluble with the first mentioned pinion; and an annular gear secured to said tubular member and with the teeth of which said second pinion meshes.

5. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted on said sleeve; a stud extending from the face thereof; a pinion thereon meshing with said gear teeth; a second pinion on said stud revoluble with the first mentioned pinion; an annular gear secured to said tubular member and with the teeth of which said second pinion meshes; and means whereby the pulley driving belt may be moved constantly in one direction while being shifted from one pulley to the other.

6. In a machine of the class described, the combination of a bed frame; a tool holder adapted to reciprocate lengthwise thereof and consisting in part of nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted on said sleeve; a stud extending from the face thereof; a pinion thereon meshing with said gear teeth; a second pinion on said stud revoluble with the first mentioned pinion; an annular gear secured to said tubular member and with the teeth of which said second pinion meshes; and means for preventing the rotation of said plate.

7. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted on said sleeve; a stud extending from the face thereof; a pinion thereon meshing with said gear teeth; a second pinion on said stud revoluble with the first mentioned pinion; an annular gear secured to said tubular member and with the teeth of which said second pinion meshes; a drum secured to said plate; and a brake band thereon adapted to frictionally contact therewith and prevent its rotation.

8. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted on said sleeve; a stud extending from the face thereof; a pinion thereon meshing with said gear teeth; a second pinion on said stud revoluble with the first mentioned pinion; an annular gear secured to said tubular member and with the teeth of which said second pinion meshes; a drum secured to said plate; a brake band on the periphery thereof; a member for holding one end of said band; a pivoted member to which the opposite end of said band is articulated; and means for moving said pivoted member about its pivot.

9. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted on said sleeve; a stud extending from the face thereof; a pinion thereon meshing with said gear teeth; a second pinion on said stud revoluble with the first mentioned pinion; an annular gear secured to said tubular member and with the teeth of which said second pinion meshes; a drum secured to said plate; a brake band on the periphery thereof; a member for holding one end of said band; a pivoted member to which the opposite end of said band is articulated; a roll on the opposite end of said pivoted member; and a slidable cam rod adapted in its movement to move said pivoted member about its pivot.

10. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted in said sleeve; a stud extending from the face thereof; a pinion thereon meshing with said gear teeth; a second pinion on said stud revoluble with the first mentioned pinion; an annular gear secured to said tubular member and with the teeth of which said second pinion meshes; a drum secured to said plate; a brake band on the periphery thereof; a member for holding one end of said band; a pivoted member to which the opposite end of said band is articulated; a roll on the opposite end of said pivoted member; a slidable cam rod adapted in its movement to move said pivoted member about its pivot; a belt for said pulley constantly moving in one direction; and a shifter for said belt secured to and movable with said rod.

11. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted on said sleeve; a stud extending from the face thereof; a pinion thereon meshing with said gear teeth; a second pinion on said stud revoluble with the first mentioned pinion; an annular gear secured to said tubular member and with the teeth of which said second pinion meshes; a drum secured to said plate; a brake band on the periphery thereof; a member for holding one end of said band; a pivoted member to which the opposite end of said band is articulated; a roll on the opposite end of said pivoted member; a slidable cam rod adapted in its movement to move said pivoted member about its pivot; a belt for said pulley constantly moving in one direction; a shifter for said belt secured to and movable with said rod; a collar secured to said rod; and a spring interposed between said collar and belt shifter.

12. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted on said sleeve; a stud extending from the face thereof; a pinion thereon meshing with said gear teeth; a second pinion on said stud revoluble with the first mentioned pinion; an annular gear secured to said tubular member and with the teeth of which said second pinion meshes; a drum secured to said plate; a brake band on the periphery thereof; a member for holding one end of said band; a pivoted member to which the opposite end of said band is articulated; a roll on the opposite end of said pivoted member; a slidable cam rod adapted in its movement to move said pivoted member about its pivot; a belt for said pulley constantly moving in one direction; a shifter for said belt secured to and movable with said rod; and means operable by the tool holder for actuating said slidable rod.

13. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; a pulley secured to said tubular member; a sleeve surrounding said tubular member and provided with gear teeth thereon; a pulley on said sleeve; a plate loosely mounted on said sleeve; a stud extending from the face thereof; a pinion thereon meshing with said gear teeth; a second pinion thereon meshing with said gear teeth; a second pinion on said stud revoluble with the first mentioned pinion; an annular gear secured to said tubular member and with the teeth of which said second pinion meshes; a drum secured to said plate; a brake band on the periphery thereof; a member for holding one end of said band; a pivoted member to which the opposite end of said band is articulated; a roll on the opposite end of said pivoted member; a slidable cam rod adapted in its movement to move said pivoted member about its pivot; a belt for said pulley constantly moving in one direction; a shifter for said belt secured to and movable with said rod; a pivoted lever the outer end of which is articulated to said slidable rod; a sliding member having projecting stops in the path of the tool holder and adapted to be moved endwise thereby; and a link between said sliding member and said pivoted lever.

14. In a machine of the class described, the combination of a bed frame; a tool holder adapted to reciprocate lengthwise thereof and consisting in part of a nonrevoluble screw; a revoluble tubular member having depressions at one end; a divided nut having projections positioned in said depressions; and means for locking together the parts of said nut.

15. In a machine of the class described, the combination of a bed frame; a tool holder adapted to reciprocate lengthwise thereof and consisting in part of a nonrevoluble screw; a revoluble tubular member having a depression at one end; a divided nut having projections positioned in said depression; and rings surrounding the opposite ends of said nut for locking together the parts thereof.

16. In a machine of the class described, the combination of a bed frame; a tool holder adapted to reciprocate lengthwise thereof and consisting in part of a nonrevoluble screw; a revoluble tubular member having a depression at one end; a divided nut having projections positioned in said depression; and rings surrounding the opposite ends of said nut for locking together the parts thereof, the interior diameter of one ring corresponding with the exterior diameter of the other.

17. In a machine of the class described, the combination of a bed frame; a tool holder adapted to reciprocate lengthwise thereof and consisting in part of a nonrevoluble screw; a revoluble tubular member having a depression at one end; a divided nut having projections positioned in said depression; and removable rings surrounding the opposite ends of said nut for locking together the parts thereof and adapted to be moved over said tubular member.

18. In a machine of the class described, the combination of a bed frame; a tool holder adapted to reciprocate lengthwise thereof and consisting in part of a nonrevoluble screw; a revoluble tubular member having a depression at one end; a divided nut having projections positioned in said depression and provided with an annular flange at one end and an annular shouldered projection adjacent the opposite end of less diameter than said flange; and means coacting with said flange and shouldered projection for locking together the parts of said nut.

19. In a machine of the class described, the combination of a bed frame; a tool holder adapted to reciprocate lengthwise thereof and consisting in part of a nonrevoluble screw; a revoluble tubular member having a depression at one end; a divided nut having projections positioned in said depression and provided with an annular flange at one end and an annular shouldered projection adjacent the opposite end of less diameter than said flange; and a ring surrounding said nut and abutting said shouldered projection.

20. In a machine of the class described, the combination of a bed frame provided with three alined bearings; a revoluble tubular member in two of said bearings; a tool holder adapted to reciprocate lengthwise of said frame and consisting in part of a nonrevoluble screw fitting the bore of said tubular member; a bushing for the third bearing surrounding said screw; and a nut for said screw between said bushing and tubular member and adapted to be rotated by said tubular member.

21. In a machine of the class described, the combination of a bed frame having a vertical end plate provided with an opening therethrough; a support therefor having a reservoir therein; a U-shaped extension to said end plate; a tool holder adapted to reciprocate lengthwise of said frame and consisting in part of a nonrevoluble screw; a nut on said screw prevented from end movement; means for revolving said nut; a working tool secured to the tool holder extending through and fitting the opening in said end plate; means for supplying oil to said U-shaped extension; and a discharge pipe therefrom at a higher level than said tool and adapted to deliver into said reservoir.

22. In a machine of the class described, the combination of a bed frame having a vertical end plate provided with an opening therethrough; a support therefor having a reservoir therein; a U-shaped extension to said end plate; a tool holder adapted to reciprocate lengthwise of said frame and consisting in part of a nonrevoluble screw; a nut on said screw prevented from end movement; means for revolving said nut; a working tool secured to the tool holder extending through and fitting the opening in said end plate; means for supplying oil to said U-shaped extension; and a discharge pipe therefrom at a higher level than said tool leading to said reservoir.

23. In a machine of the class described, the combination of a bed frame having a vertical end plate provided with an opening therethrough; a U-shaped extension to said end plate; a tool holder adapted to reciprocate lengthwise of said frame and consisting in part of a nonrevoluble screw; a nut on said screw prevented from end movement; a working tool secured to the tool holder extending through and fitting the opening in said end plate; and means for supplying oil to said extension and maintaining it at a level above the working tool during its operation.

24. In a machine of the class described, the combination of a bed frame having a vertical end plate provided with an opening therethrough; a U-shaped extension to said end plate; a tool holder adapted to reciprocate lengthwise of said frame and consisting in part of a nonrevoluble screw; a nut on said screw prevented from end movement; a working tool secured to the tool holder; a bushing in the opening in said end plate and having a semi-spherical bearing surface; a semi-spherical tool guiding member positioned against said semi-spherical bearing surface and movable thereon, said member having an opening therethrough fitting said tool; and means for preventing the displacement of said tool guiding member.

25. In a machine of the class described, the combination of a bed frame having a vertical end plate provided with an opening therethrough; a U-shaped extension to said end plate; a tool holder adapted to reciprocate lengthwise of said frame and consisting in part of a nonrevoluble screw; a nut on said screw prevented from end movement; a working tool secured to the tool holder; and a plurality of alined blocks of soft material having depressions in their upper faces, said blocks being secured to said extension and adapted to support the working tool when disconnected from the tool holder.

26. In a machine of the class described, the combination of a bed frame having a horizontal extension provided with a vertical end plate having an opening therethrough; a tool holder adapted to reciprocate lengthwise of said frame and consisting in part of a nonrevoluble screw; means coacting with said screw for moving it endwise; a working tool secured to said tool holder and extending through said opening; and a support for the outer end of the extension of said bed frame having a flat vertical face alined with the outer face of said end plate and provided with a pair of T-shaped grooves.

27. In a machine of the class described, the combination of a bed frame having guides extending longitudinally thereof; a tool holder adapted to be reciprocated on said guides and consisting in part of a nonrevoluble screw; means coacting with said screw for moving it endwise consisting in part of a driving mechanism operable by a single belt constantly moving in one direction; a belt shifting device; a slidable rod on said bed frame for actuating said belt shifting device; stop projections mounted on said rod; a grooved pin on said holder with its end normally in the path of said stop projections; and a spring pressed ball engaging said groove and retaining it in operative position.

28. In a machine of the class described, the combination of a bed frame having guides extending longitudinally thereof; a tool holder adapted to be reciprocated on said guides and consisting in part of a nonrevoluble screw; means coacting with said screw for moving it endwise consisting in part of a driving mechanism operable by a single belt constantly moving in one direction; a belt shifting device; a slidable rod on said bed frame for actuating said belt shifting device; stop projections mounted on said rod; a pin on said holder with its ends normally in the path of said stop projections; and means for locking said pin in operative or inoperative position.

29. In a machine of the class described, the combination of a bed frame having guides extending longitudinally thereof; a tool holder adapted to be reciprocated on said guides and consisting in part of a nonrevoluble screw; means coacting with said screw for moving it endwise consisting in part of a driving mechanism operable by a single belt constantly moving in one direction; a belt shifting device; a slidable rod on said bed frame for actuating said belt shifting device; stop projections mounted on said rod; a pin on said holder having two annular grooves therein with its end normally in the path of said stop projections; and a spring pressed ball adapted to engage either groove for locking said pin in operative or inoperative position.

30. In a machine of the class described, the combination of a bed frame having a guide rail extending longitudinally of one side thereof; a carriage thereon having a semicylindrical bearing for the outer end of the working tool; a reciprocating tool holder; a working tool having one end secured in said tool holder and the other end positioned in said bearing; and a cap for said bearing.

31. In a machine of the class described, the combination of a bed frame having a guide rail extending longitudinally of one side thereof; a carriage thereon having a semicylindrical bearing for the outer end of the working tool; a reciprocating tool holder; a working tool having one end secured in said tool holder and the other end positioned in said bearing; a pivoted cap for said bearing; and means for locking said cap to said carriage.

32. In a machine of the class described, the combination of a bed frame having a guide rail extending longitudinally of one side thereof; a carriage thereon having a semicylindrical bearing for the outer end of the working tool; a reciprocating tool holder; a working tool having one end secured in said tool holder and the other end positioned in said bearing; a pivoted cap for said bearing; and a bale pivoted to said carriage adapted to be moved over the free end of said cap to lock it in position.

33. In a machine of the class described, the combination of a bed frame having a guide rail extending longitudinally of one side thereof; a carriage thereon having a semicylindrical bearing for the outer end of the working tool; a reciprocating tool holder; a working tool having one end secured in said tool holder and the other end positioned in said bearing; a pivoted cap for said bearing; a bale pivoted to said carriage and adapted to be moved over the free end of said cap; and a spring pressed member to engage said cap.

34. In a machine of the class described, the combination of a bed frame having a guide rail extending longitudinally of one side thereof; a carriage thereon; a reciprocating tool holder; a working tool the opposite ends of which are held in said tool holder and carriage; a slidable stop on said guide rail; means for clamping said stop to said rail; and a spring pressed member on said stop in the path of said carriage.

35. In a machine of the class described, the combination of a bed frame having a guide rail extending longitudinally of one side thereof; a carriage thereon; a reciprocating tool holder; a working tool the opposite ends of which are held in said tool holder and carriage; a slidable stop on said guide rail; means for clamping said stop to said rail; a spring pressed member on said stop in the path of said carriage; and a weight for returning said carriage to its normal position at the end of the operating movement of the working tool.

36. In a machine of the class described, the combination of a bed frame; a tool holder adapted to reciprocate lengthwise thereof and consisting in part of a nonrevoluble screw; a nut on said screw provided with a projection thereon; a revoluble tubular member having a depression to receive said projection; and means for rotating said tubular member in either direction.

37. In a machine of the class described, the combination of a bed frame; a tool holder adapted to reciprocate lengthwise thereof and consisting in part of a nonrevoluble screw; a nut on said screw; a tubular member locked to said nut in alinement therewith and through which said screw is adapted to be moved; and means for rotating said tubular member in either direction.

38. In a machine of the class described, the combination of a bed frame; a tool holder adapted to reciprocate lengthwise of said bed frame and consisting in part of a nonrevoluble screw; a nut on said screw; means for rotating said nut in either direction; a working tool carried by said holder; and means for keeping said tool submerged in oil while operating upon the work.

Signed by me at ⊦ Post Office Sq., Boston, Mass., this 28th day of April, 1917.

FRANCIS J. LAPOINTE.

Witnesses:
WALTER E. LOMBARD,
NATHAN C. LOMBARD.